United States Patent
Morris et al.

(10) Patent No.: US 9,176,992 B2
(45) Date of Patent: *Nov. 3, 2015

(54) PHOTOSHARING SERVER FILTERS FOR AUTOMATIC STORAGE AND SHARING OF DIGITAL FILES

(75) Inventors: Robert P. Morris, Raleigh, NC (US); Hugh B. Svendsen, Chapel Hill, NC (US); Patricia Scardino, Apex, NC (US)

(73) Assignee: LG ELECTRONICS INC., Seoul (KR)

( * ) Notice: Subject to any disclaimer, the term of this patent is extended or adjusted under 35 U.S.C. 154(b) by 1981 days.

This patent is subject to a terminal disclaimer.

(21) Appl. No.: 12/260,671

(22) Filed: Oct. 29, 2008

(65) Prior Publication Data

US 2009/0055371 A1 Feb. 26, 2009

Related U.S. Application Data

(63) Continuation of application No. 10/377,920, filed on Feb. 27, 2003, now Pat. No. 7,461,094.

(51) Int. Cl.
G06F 17/30 (2006.01)

(52) U.S. Cl.
CPC .... *G06F 17/30274* (2013.01); *G06F 17/30265* (2013.01)

(58) Field of Classification Search
CPC .................................................. G06F 17/30637
USPC .......................... 707/634, 791, 793, 804, 706
See application file for complete search history.

(56) References Cited

U.S. PATENT DOCUMENTS

| 6,058,428 | A | 5/2000 | Wang et al. |
|---|---|---|---|
| 6,499,016 | B1 | 12/2002 | Anderson |
| 6,571,246 | B1 | 5/2003 | Anderson et al. |
| 6,636,259 | B1 | 10/2003 | Anderson et al. |
| 6,757,684 | B2 | 6/2004 | Svendsen et al. |

(Continued)

FOREIGN PATENT DOCUMENTS

| EP | 1 076 302 A1 | 2/2001 |
|---|---|---|
| JP | 05257669 A | 10/1993 |

(Continued)

OTHER PUBLICATIONS

"ImpAKT2 File Uploading", Interakt Professional Web Tools, version 1.0.4 (hereafter ImpAKT2), Jan. 7, 2003.*

(Continued)

*Primary Examiner* — Apu Mofiz
*Assistant Examiner* — Cindy Nguyen
(74) *Attorney, Agent, or Firm* — Birch, Stewart, Kolasch & Birch, LLP

(57) ABSTRACT

A method and system for providing on online file-service that automatically stores and organizes digital files. The method and system include providing the server with a set of trigger handlers that are each configured to perform a particular action on a digital file. The user may log into the server and specify attribute criteria for each of the trigger handlers. Digital files uploaded by the user are received by the server, wherein each file has a plurality of attributes associated therewith. The attributes of each file are then compared with the attribute criteria entered by the user for each of the trigger handlers. And upon a match, the corresponding trigger handler is invoked, such that actions are automatically performed on the digital files.

27 Claims, 6 Drawing Sheets

(56) References Cited

U.S. PATENT DOCUMENTS

| | | | |
|---|---|---|---|
| 7,590,559 B2 * | 9/2009 | Ogawa et al. | 705/26.81 |
| 2001/0009008 A1 | 7/2001 | Ovadya et al. | |
| 2002/0051189 A1 | 5/2002 | Usami | |
| 2002/0065741 A1 | 5/2002 | Baum | |
| 2002/0070982 A1 | 6/2002 | Hill et al. | |
| 2002/0087546 A1 | 7/2002 | Slater et al. | |
| 2002/0093678 A1 | 7/2002 | Skidgel et al. | |
| 2002/0194108 A1 | 12/2002 | Kitze | |
| 2003/0063770 A1 | 4/2003 | Svendsen et al. | |
| 2003/0154178 A1 | 8/2003 | McIntyre et al. | |
| 2003/0182143 A1 | 9/2003 | Conrad et al. | |
| 2003/0182324 A1 | 9/2003 | Satomi et al. | |
| 2004/0015467 A1 | 1/2004 | Fano | |
| 2004/0111415 A1 | 6/2004 | Scardino et al. | |
| 2004/0111493 A1 | 6/2004 | Yamaguchi et al. | |
| 2004/0139172 A1 | 7/2004 | Svendsen et al. | |

FOREIGN PATENT DOCUMENTS

| | | |
|---|---|---|
| JP | 2000057169 A | 2/2000 |
| JP | 2002305651 A | 10/2002 |
| JP | 2002318852 A | 10/2002 |
| WO | WO 02/08926 A1 | 1/2002 |
| WO | WO 02/21751 A2 | 3/2002 |

OTHER PUBLICATIONS

No Author, File Uploading in ImpAKT2—Overview, (article), Apr. 2, 2007, 29 pages, http://www.interaktonline.com/Support/Articles/Details/File+Uploading+in+ImpAKT+2-File+uploading+explained.html?id_art=48.id_asc=55.

No Author, Yahoo! Photos: Photos Help, (artilce), Apr. 14, 2001, 27 pages, see p. 2.

Non-Final Office Action mailed Sep. 15, 2004 issued by the Patent Office during the prosecution of U.S. Appl. No. 10/377,920. Attached as Appendix A.

Non-Final Office Action mailed Apr. 19, 2005 issued by the Patent Office during the prosecution of U.S. Appl. No. 10/377,920. Attached as Appendix B.

Final Office Action mailed Oct. 4, 2005 issued by the Patent Office during the prosecution of U.S. Appl. No. 10/377,920. Attached as Appendix C.

Non-Final Office Action mailed Dec. 21, 2005 issued by the Patent Office during the prosecution of U.S. Appl. No. 10/377,920. Attached as Appendix D.

Final Office Action mailed Jun. 13, 2006 issued by the Patent Office during the prosecution of U.S. Appl. No. 10/377,920. Attached as Appendix E.

Non-Final Office Action mailed Apr. 10, 2007 issued by the Patent Office during the prosecution of U.S. Appl. No. 10/377,920. Attached as Appendix F.

Non-Final Office Action mailed Oct. 11, 2007 issued by the Patent Office during the prosecution of U.S. Appl. No. 10/377,920. Attached as Appendix G.

Final Office Action mailed Mar. 17, 2008 issued by the Patent Office during the prosecution of U.S. Appl. No. 10/377,920. Attached as Appendix H.

Advisory Action mailed Jun. 16, 2008 issued by the Patent Office during the prosecution of U.S. Appl. No. 10/377,920. Attached as Appendix I.

Notice of Allowance mailed Jul. 30, 2008 issued by the Patent Office during the prosecution of U.S. Appl. No. 10/377,920. Attached as Appendix J.

Supplementary European Search Report completed Mar. 29, 2006, for European Application No. 04715653.4. Attached as Appendix K.

International Search Report completed Sep. 23, 2004, for PCT/US04/05873. Attached as Appendix L.

* cited by examiner

Album Creation/Population Trigger Form

Define criteria for filtering your uploaded images:

Attribute Criteria 42:

| Fields 46 | Operators 48 | Values 50 |
|---|---|---|
| Date | >= | 12-01-02 |
| Date | <= | 12-31-02 |
| Category | Contains | Holiday |
|  |  |  |

Define actions to be performed on your uploaded images:

Actions 44:

Create/Add to Album: Christmas 2002
and
Create/Add to Album: December 2002

Permissable File Types:

- Images ☐
- Audio ☐
- All ☒
- Video ☐
- Text ☐

FIG. 3

Notification Trigger Form

Define criteria for filtering your uploaded images:

| Fields (46) | Operators (48) | Values (50) |
|---|---|---|
| Date | >= | 12-01-02 |
| Date | <= | 12-31-02 |
| Category | Contains | Holiday |
| ⋮ | ⋮ | ⋮ |
| | | |

Attribute Criteria 42

Define actions to be performed on your uploaded images:

Send email to: Hugh, Steve, Joe@yahoo.com — 60

Use Template: My Template — 62

Add Message: Look at this stuff! — 64

Attach Image [X] — 66

Add link to image [ ]

Send -
   for every match
   Once each day for all matches
   Once - Per month [ ]  Per Week [X] — 68

Actions 44

FIG. 4

Print Trigger Form

Define criteria for filtering your uploaded images:

Attribute Criteria 42:

| Fields (46) | Operators (48) | Values (50) |
|---|---|---|
| Date | >= | 12-01-02 |
| Date | <= | 12-31-02 |
| Category | Contains | Holiday |
| ⋮ | ⋮ | ⋮ |
|  |  |  |

Define actions to be performed on your uploaded images:

Actions 44:

No. of times to print [2] — 70
Size: [4x6]

Send order -
   for each image [ ]
   each month [X] — 72
   each week [ ]

Send prints to: [Me, Steve, Patty] — 74

FIG. 5

Postcard Trigger Form

Define criteria for filtering your uploaded images:

Attribute Criteria 42:

| Fields (46) | Operators (48) | Values (50) |
|---|---|---|
| Date | >= | 12-01-02 |
| Date | <= | 12-31-02 |
| Category | Contains | Holiday |
| ... | ... | ... |
|  |  |  |

Define actions to be performed on your uploaded images:

Actions 44:

Postcard ID [4378] — 80

Send prints to: [grandma@xyz.com / bob@excite.com] — 82

Send [2] times — 84

Send -
    for each match ☐
    on date [ ] — 86
    every [3rd] match

FIG. 6

PHOTOSHARING SERVER FILTERS FOR AUTOMATIC STORAGE AND SHARING OF DIGITAL FILES

CROSS-REFERENCE TO RELATED APPLICATION

The present application is a continuation of U.S. patent application Ser. No. 10/377,920, now U.S. Pat. No. 7,461,094, filed on Feb. 27, 2003, the disclosure of which is hereby incorporated by reference in its entirety.

FIELD OF THE INVENTION

The present invention relates to electronic storage and sharing of digital files, and more particularly to a method and system for providing photosharing server filters for automatic storage and organization of digital images of different types.

BACKGROUND OF THE INVENTION

Users who wish to store and organize digital files including images, music, and video have two basic options. One option is to store and organize the digital files in containers on their PCs using a standard tree-based directory service provided by most computer operating systems (e.g., Windows™, UNIX™, Macintosh™). File system directories are capable of storing digital files of any Mime type. Mime type is a file identification based on the Mime encoding system and is a standard for identifying content of a file. The major Mime types are applications, audio, image, text, and video. Typically, anyone with permission to write to a directory may store any file there regardless of the Mime type of the file.

The second option is to store digital files into containers, such as albums in online photosharing sites, and containers controlled by software applications, e.g., photo collection applications, music collection applications, and video collection applications, for example.

Unlike file system directories, however, containers in the second option are capable of storing and handling only specific types of digital files. For example, only digital images can be uploaded to online photosharing sites or imported into photo collection applications, while only music files can be handled by music collection applications. In these types of applications, users cannot specify the specific media types that will be stored or shared. For example, in conventional online photosharing, a user is unable to store both images and video clips in a common album.

With respect to conventional photosharing sites specifically, not only is the user limited to uploading only image files, but once the images are uploaded to the site, the user must manually organize the images by creating new photo albums and then moving selected images to the appropriate photo albums.

Once the images are manually stored and organized, the user may then notify others of the images using one of two methods. In the first method, the user sets preferences for the album specifying what users have permission to view the album, and personally informs each person of the web address of the album. In the second and more common method, the user types-in the e-mail addresses of each person the user wants to view the album and the photosharing site automatically sends an e-mail inviting recipients to view the album by clicking on the enclosed URL.

Overtime, users find manually organizing files and sending notifications image-by-image to be burdensome and tedious. Accordingly, what is needed is an improved method and system for storing and organizing digital files. The present invention addresses such a need.

SUMMARY

The present invention is a method and system for providing on online file-service that automatically stores and organizes digital files. The method and system include providing the server with a set of trigger handlers that are each configured to perform a particular action on a digital file. The user may log into the server and specify attribute criteria for each of the trigger handlers. Digital files uploaded by the user are received by the server, wherein each file has a plurality of attributes associated therewith. The attributes of each file are then compared with the attribute criteria entered by the user for each of the trigger handlers. And upon a match, the corresponding trigger handler is invoked, such that actions are automatically performed on the digital files.

According to the method and system disclosed herein, the user is allowed to configure the trigger handlers to take desired actions on the files, such as creating containers and populating the containers with uploaded files that meet the users specified criteria, sending automatic email notifications to addresses entered the by the user, and printing files created on certain dates, for example.

BRIEF DESCRIPTION OF THE DRAWINGS

FIG. 3 is a form corresponding to an Album creation/population trigger.

FIG. 4 is a form corresponding to a Notification trigger.

FIG. 5 is a form corresponding to a Print trigger.

FIG. 6 is a form corresponding to a Postcard Trigger.

DETAILED DESCRIPTION OF THE INVENTION

The present invention relates to a method and system for providing a file service that automatically stores and organizes digital files of different Mime types. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides an improved method and system for storing and organizing digital files in which files are uploaded to a server for storage, and the server automatically stores and organizes the files based on attributes of the files specified by the user. In addition, files of different types may be stored in the same container.

Figure 1:
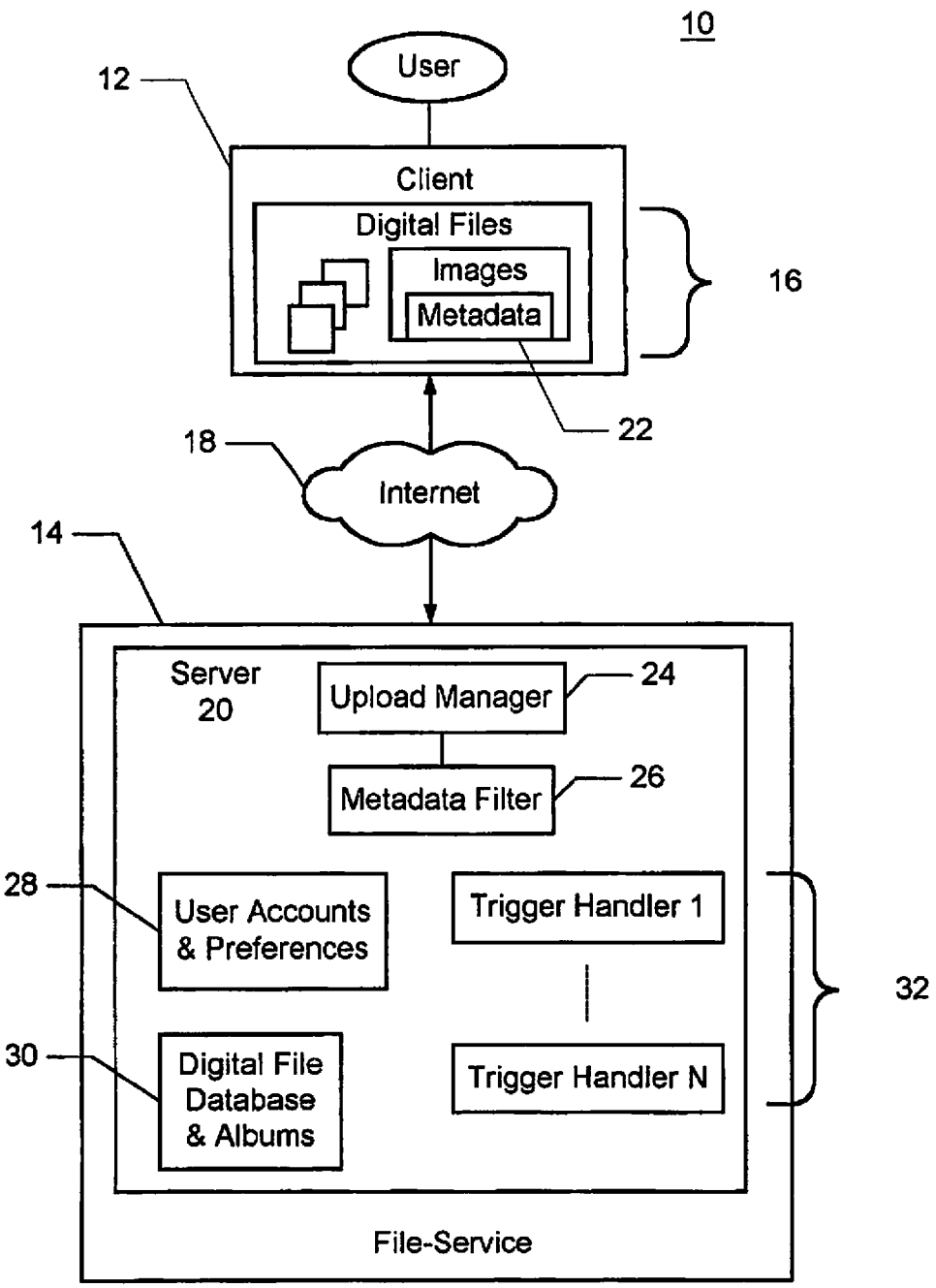
FIG. 1 is a block diagram illustrating an online file-service system that automatically stores and organizes digital files in accordance with a preferred embodiment of the present invention.

FIG. 1 is a block diagram illustrating an online file-service system 10 that automatically stores and organizes digital files in accordance with a preferred embodiment of the present invention. The system 10 includes one or more client devices 12 that access a file-service site 14 over a network 18, such as the Internet. Once connected to the Internet, the client device 12 has the capability of uploading digital files 16 to the file-service site 14 for storage and/or for receiving digital files 16 from the file-service site 14 for display.

A client device 12 refers to an electronic device capable of storing digital files and communicating over a network 18, such as PCs. The digital files 16 may have different Mime types, including text, images, audio, and movie files. In a preferred embodiment, the client devices 12 are browser-based, although non-browser-based devices may also be supported using a specialized application (not shown) executing on the device 12.

In one preferred embodiment, the file-service site 14 is a photosharing site, and the type of digital files 16 that are uploaded to the site are predominately digital images, but also include video clips, and audio. In the photosharing embodiment, a client device 12 may also include any electronic device capable of storing digital images and/or video, such as photo kiosks, web-enabled digital cameras, PDAs, and cellphones, for example.

In a preferred embodiment, some or all of the digital files 16, particularly images, have metadata 22 associated with them that describes and/or categorizes the file 16. The metadata 22 may be included within the files 16, or be stored in a separate file 16. Other types of digital files 16 may also include metadata 22, such as HTML and XML documents, for example.

In accordance with one aspect of the present invention, the online file-service site 14 can be configured by the user to store different types of files 16 in the same container (albums in a preferred embodiment), and to automatically perform actions on each file 16 based on specified attributes of the file 16, including the Mime type.

To accomplish these functions, the file service site 14 comprises at least one server 20 that includes a web server/upload manager 24, a metadata filter 26, a user accounts and preferences database 28, a digital file and album database 30, and one or more trigger handlers 32. The web server/upload manager 24 accepts connections from the client device 12 and receives uploaded files 16. The web server/upload manager 24 also handles interactions from web browsers (not shown) for setting user preferences and requests to view container albums.

The trigger handlers 32 are routines that automatically perform respective actions on the files 16. In a preferred embodiment, there are categories of trigger handlers 32 that include container creation/population handlers, notification handlers, printing handlers, and postcard handlers. The user accesses the server 20 over the web to configure filter preferences, which are rules that govern when the trigger handlers 32 are called to operate on a particular image based on attributes of the file. In a preferred embodiment, filter preferences are stored in the user accounts and preferences database 28.

As the files 16 are uploaded, the metadata filter 26 extracts the metadata 22 associated with each uploaded file 16, and if the metadata 22 matches any of the user-configured file attributes of the filter preferences stored in the user preferences database 28, the appropriate trigger handler 32 is called to automatically perform its operation on the file 16, such as creating an album and storing the file 16 in that album.

Figure 2:
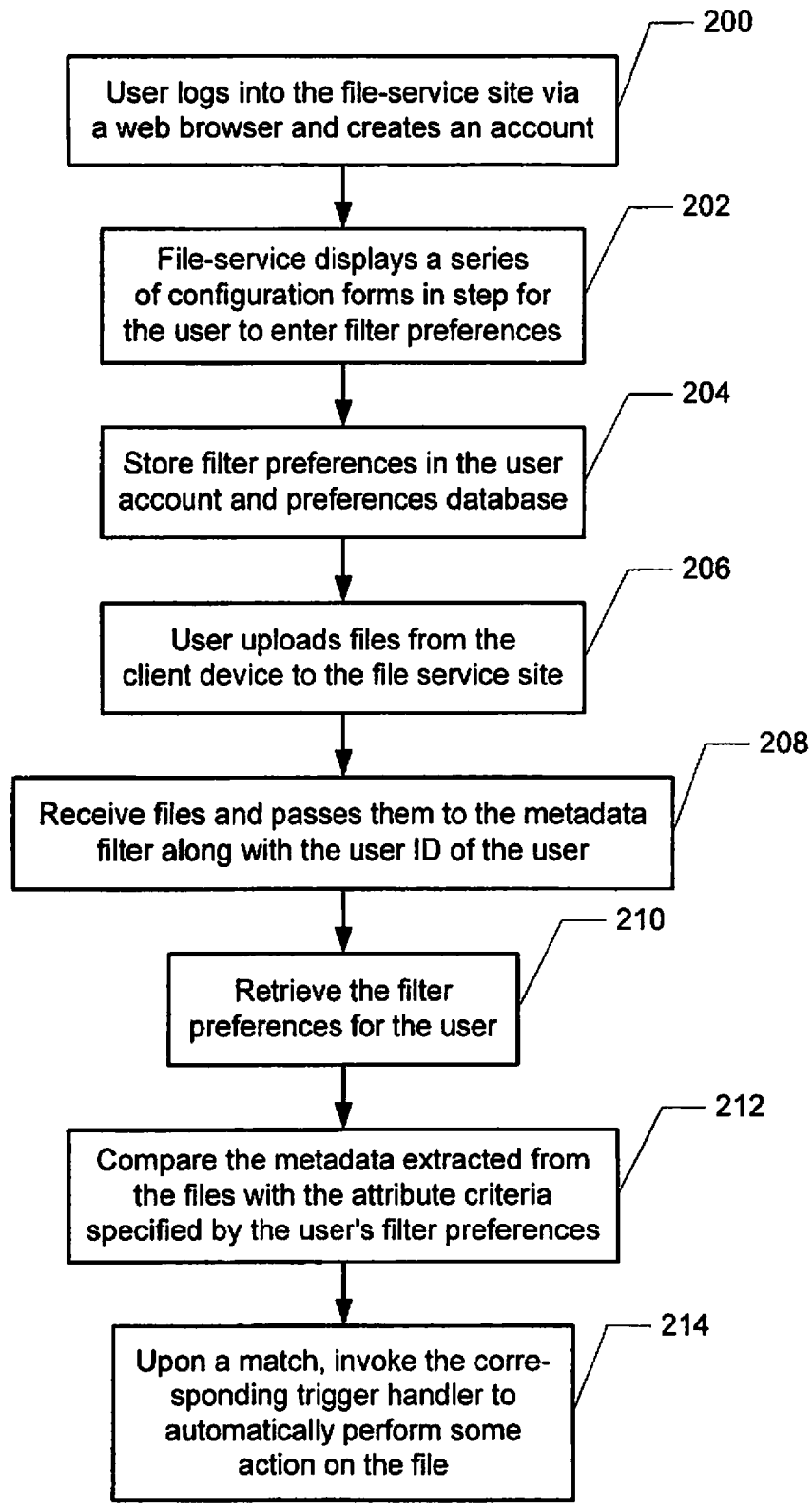
FIG. 2 is a flow diagram of the process for automatically storing and organizing digital files uploaded to file-service site in accordance with a preferred embodiment of the present invention.

FIG. 2 is a flow diagram of the process for automatically storing and organizing digital files uploaded to the file-service site 14 in accordance with a preferred embodiment of the present invention. The process begins in step 200 when a user logs into the file-service site 14 via a web browser and creates an account. All the user's account information, including user ID, is stored in the user account and preferences database 28.

Once the user has become a member of the file-service 14, the file-service 14 displays a series of configuration forms in step 202 for the user to enter filter preferences that control when each of the trigger handlers 32 are called when the user uploads files 16. In a preferred embodiment, the filter preferences forms are specific to the different types of trigger handlers 32 available, and have fields for a user to enter attribute criteria for the images that will be used to filter the files 16 to the appropriate trigger handler upon upload.

FIGS. 3-6 are diagrams illustrating example filter preference forms. FIG. 3 is a form corresponding to an Album creation/population trigger. FIG. 4 is a form corresponding to a Notification trigger. FIG. 5 is a form corresponding to a Print trigger. And FIG. 6 is a form corresponding to a Postcard Trigger.

Referring to FIG. 3, each form 40 includes two sections, an Attribute Criteria section 42, and an "Actions" section 44. The Attribute Criteria section 42 allows the user to specify which file attributes and metadata fields from uploaded files 16 are to be matched and the nature of the match for invoking the proper trigger handler 32. In one embodiment, the Attribute Criteria section 42 includes a column for the user to enter metadata field names 46, a column for entering operators 48, and a column for entering values 50 for the corresponding field name.

The Actions section 44 of the filter preferences form 40 is specific to the trigger handler 32, but allows the user to specify what actions are to be taken in response to a match, such as the creation/population of a specified album, for instance.

Referring again to FIG. 2, after the user completes the filter preferences forms 40, in step 204 the filter preferences are stored in the user account and preferences database 28. Anytime thereafter, the user may upload files from the client device 12 to the file service site 14 in step 206. In step 208 the web server/upload manager 24 receives the files 16 and passes them to the metadata filter 26 along with the user ID of the user. In step 210, the metadata filter 26 uses the user ID to retrieve the filter preferences for the user. In step 212, the metadata filter 26 extracts the metadata 22 from the files 16 as they are received and compares the extracted metadata 22 with the attribute criteria 42 specified by the user's filter preferences. When the metadata filter 26 detects a match in step 214, the metadata filter 26 invokes the corresponding trigger handler 32, such that actions defined by the trigger handler 32 and the user preferences are automatically performed on the digital files 16.

As shown in FIG. 3, for example, the user has entered preferences that will configure the server 20 to automatically store files matching the criteria in the Attribute Criteria section 42 into two albums named "Christmas 2002" and "December 2002." Any files 16 uploaded by the user whose metadata "date" field has values between "Dec. 01, 2002" and "Dec. 31, 2002" and whose metadata "category" field "contains" the value "holiday," will be stored in the two specified albums. If the albums do not yet exist, then the server 20 will create them. For albums, the Actions section 44 also allows the user to specify what Mime types the albums may store. If "All" is selected, then the albums will be able to store and display files of any type.

Other examples of file preferences forms are shown in FIGS. 4-6. The Attribute Criteria section 42 on these forms is similar to that shown in FIG. 3, and like components have like reference numerals. Referring to FIG. 4, the filter preferences form 40' for the notification trigger is shown according to the present invention. The notification trigger allows the user to configure the server 20 to automatically send out notifications regarding the arrival of certain files 16 to specified third parties by email, pager, and/or facsimile. The filter preferences form 40' shown in FIG. 4 is for email notification. The Actions section 44 of the form 40' includes a field 60 for entering the email addresses of recipients, a field 62 for choosing an email template, a field 64 for adding an optional message to the email, and a check box 66 designating whether to attach the file 16 or add a link to the file 16. The form 40' may also include sending options 68 for designating how often the email notification is sent when a matching file 16 is detected. The options 68 may include sending the email upon every match, sending one email a day for all matches, or sending all notifications once per week.

Referring to FIG. 5, the filter preferences form 40" for the Print trigger is shown. The Print trigger automatically prints the files 16 matching the attribute criteria 42. The Actions section of the form 40" includes fields 70 for the user to specify the number of prints per image, and the size of the print. Also, included are sending options 72 and a field 74 for designating recipients.

Referring to FIG. 6, the filter preferences form 40''' for the Postcard Trigger is shown. The Postcard trigger walks the user through creating an electronic postcard that incorporates a matching image and that is then sent to a specified recipient. The Actions section 44 of the form 40''' includes fields 80 for the user to select a postcard, a field 82 for the email address of the recipients, a field 84 for the number of times to send, and a field 86 for when the postcard should be sent.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for providing an online file service that automatically stores and organizes digital files, the method comprising:
    a) providing a server with a set of trigger handlers that are each configured to perform a particular action on a digital file;
    b) allowing a user to access the server and configure the trigger handlers by specifying attribute criteria for each of the trigger handlers, wherein the trigger handlers provide corresponding configuration forms for the user to enter the attribute criteria, each of which is provided with a first section for allowing the user to specify which file attributes and metadata fields from uploaded files are to be matched, and a second section for allowing the user to specify what actions are to be taken in response to a match, and wherein the configuration forms have the same first section throughout the set of the trigger handlers;
    c) receiving the digital files uploaded to the server, wherein each uploaded digital file has a plurality of attributes associated therewith;
    d) comparing the plurality of attributes of a specific uploaded digital file among the uploaded digital files with the attribute criteria entered by the user for each of the trigger handlers;
    e) upon a first match, invoking a first trigger handler corresponding to the first match, such that first actions associated with the invoked first trigger handler are automatically performed on the specific uploaded digital file, wherein the first actions cause the server to automatically create two specified containers and store the specific uploaded digital file in both of the two specified containers according to the attribute criteria of the first trigger handler; and
    f) upon a second match, invoking a second trigger handler corresponding to the second match, such that second actions associated with the invoked second trigger handler are automatically performed on the specific uploaded digital file, the second actions being different from the first actions.

2. The method of claim 1, wherein providing the server with the set of trigger handlers further includes: providing one or more categories of trigger handlers, including any combination of a container creation/population handler, a notification handler, a print handler, or a postcard handler.

3. The method of claim 2, wherein the first trigger handler includes the container creation/population handler.

4. The method of claim 1, wherein allowing the user to access the server and configure the trigger handlers further includes: allowing the user to specify the attribute criteria for the container creation/population handler to store the uploaded digital files of the different Mime types in a same container.

5. The method of claim 2, wherein receiving the uploaded digital files and comparing the plurality of attributes of the specific uploaded digital file further includes: extracting any metadata associated with the specific uploaded digital file, and comparing the metadata with the attribute criteria specified by the user for each of the trigger handlers.

6. The method of claim 3, wherein allowing the user to access the server and configure the trigger handlers further includes: creating a user account for the user, including a user ID.

7. The method of claim 1, wherein allowing the user to access the server and configure the trigger handlers further includes: saving the attribute criteria specified by the user for each of the trigger handlers as filter preferences.

8. The method of claim 7, wherein allowing the user to access the server and configure the trigger handlers further includes: storing the filter preferences with a user account.

9. The method of claim 8, wherein receiving the uploaded digital files further includes: when the digital files are uploaded, using a user ID of the user to retrieve the filter preferences of the user.

10. A method for providing an online photosharing service that automatically stores and organizes digital files, the method comprising:
    a) providing a server with a set of trigger handlers that are each configured to perform a particular action on a digital file, the server adapted to provide online photosharing;
    b) allowing a user to access the server and configure the trigger handlers by specifying attribute criteria for each of the trigger handlers, wherein the trigger handlers provide corresponding configuration forms for the user to enter the attribute criteria, each of which is provided with a first section for allowing the user to specify which file attributes and metadata fields from uploaded files are to be matched and a second section for allowing the user to specify what actions are to be taken in response to a match, and wherein the configuration forms have the same first section throughout the set of the trigger handlers;

c) receiving the digital files, including digital files and files of another Mime type, uploaded to the server, wherein each uploaded digital file has a plurality of attributes associated therewith;

d) comparing the plurality of attributes of a specific uploaded digital file among the uploaded digital files with the attribute criteria entered by the user for each of the trigger handlers;

e) upon a first match, invoking a first trigger handler corresponding to the first match, such that first actions associated with the invoked first trigger handler are automatically performed on the specific uploaded digital file, wherein the first actions cause the server to automatically create two specified containers and store the specific uploaded digital file in both of the two specified containers in the light of the attribute criteria of the first trigger handler; and f) upon a second match, invoking a second trigger handler corresponding to the second match, such that second actions associated with the invoked second trigger handler are automatically performed on the specific uploaded digital file, the second actions being different from the first actions.

11. The method of claim 10, wherein providing the server with the set of trigger handlers further includes: providing one or more categories of trigger handlers, including any combination of a container creation/population handler, a notification handler, a print handler, or a postcard handler.

12. The method of claim 11, wherein the first trigger handler includes the container creation/population handler.

13. The method of claim 10, wherein allowing the user to access the server and configure the trigger handlers further includes: allowing the user to specify the attribute criteria for the container creation/population handler to store the uploaded digital files of the different Mime types in a same container, including any combination of images, video, audio, or text.

14. The method of claim 11, wherein receiving the uploaded digital files and comparing the plurality of attributes of the specific uploaded digital file further includes: extracting any metadata associated with the specific uploaded digital file, and comparing the metadata with the attribute criteria specified by the user for each of the trigger handlers.

15. The method of claim 12, wherein allowing the user to access the server and configure the trigger handlers further includes: creating a user account for the user, including a user ID.

16. The method of claim 10, wherein allowing the user to access the server and configure the trigger handlers further includes: saving the attribute criteria specified by the user for each of the trigger handlers as filter preferences.

17. The method of claim 16, wherein allowing the user to access the server and configure the trigger handlers further includes: storing the filter preferences with a user account.

18. The method of claim 17, wherein receiving the uploaded digital files further includes: when digital files are uploaded, using a user ID of the user to retrieve the filter preferences of the user.

19. A computer-readable medium containing program instructions for providing an online file service that automatically stores and organizes digital files, the instructions for:

a) providing a server with a set of trigger handlers that are each configured to perform a particular action on a digital file;

b) allowing a user to access the server and configure the trigger handlers by specifying attribute criteria for each of the trigger handlers, wherein the trigger handlers provide corresponding configuration forms for the user to enter the attribute criteria, each of which is provided with a first section for allowing the user to specify which file attributes and metadata fields from uploaded files are to be matched, and a second section for allowing the user to specify what actions are to be taken in response to a match, and wherein the configuration forms have the same first section throughout the set of the trigger handlers;

c) receiving digital files uploaded to the server, wherein each uploaded digital file has a plurality of attributes associated therewith;

d) comparing the plurality of attributes of a specific uploaded digital file among the uploaded digital files with the attribute criteria entered by the user for each of the trigger handlers;

e) upon a first match, invoking a first trigger handler corresponding to the first match, such that first actions associated with the invoked trigger handler are automatically performed on the specific uploaded digital file, wherein the first actions cause the server to automatically create two specified containers and store the specific uploaded digital file in both of the two specified containers in the light of the attribute criteria of the first trigger handler; and f) upon a second match, invoking a second trigger handler corresponding to the second match, such that second actions associated with the invoked second trigger handler are automatically performed on the specific uploaded digital file, the second actions being different from the first actions.

20. The computer-readable medium of claim 19, wherein instruction (a) further includes the instruction of: providing one or more categories of trigger handlers, including any combination of a container creation/population handler, a notification handler, a print handler, or a postcard handler.

21. The computer-readable medium of claim 20, wherein the first trigger handler includes the container creation/population handler.

22. The computer-readable medium of claim 19, wherein instruction (b) further includes the instruction of: allowing the user to specify the attribute criteria for the container creation/population handler to store the uploaded digital files of the different Mime types in the same container.

23. The computer-readable medium of claim 20, wherein instructions (c) and (d) further include the instruction of: extracting any metadata associated with the specific uploaded digital file, and comparing the metadata with the attribute criteria specified by the user for each of the trigger handlers.

24. The computer-readable medium of claim 21, wherein instruction (b) further includes the instruction of: creating a user account for the user, including a user ID.

25. The computer-readable medium of claim 19, wherein instruction (b) further includes the instruction of: saving the attribute criteria specified by the user for each of the trigger handlers as filter preferences.

26. The computer-readable medium of claim 25, wherein instruction (b) further includes the instruction of: storing the filter preferences with a user account.

27. The computer-readable medium of claim 26, wherein instruction (c) further includes the instruction of: when the digital files are uploaded, using a user ID of the user to retrieve the filter preferences of the user.

\* \* \* \* \*